UNITED STATES PATENT OFFICE.

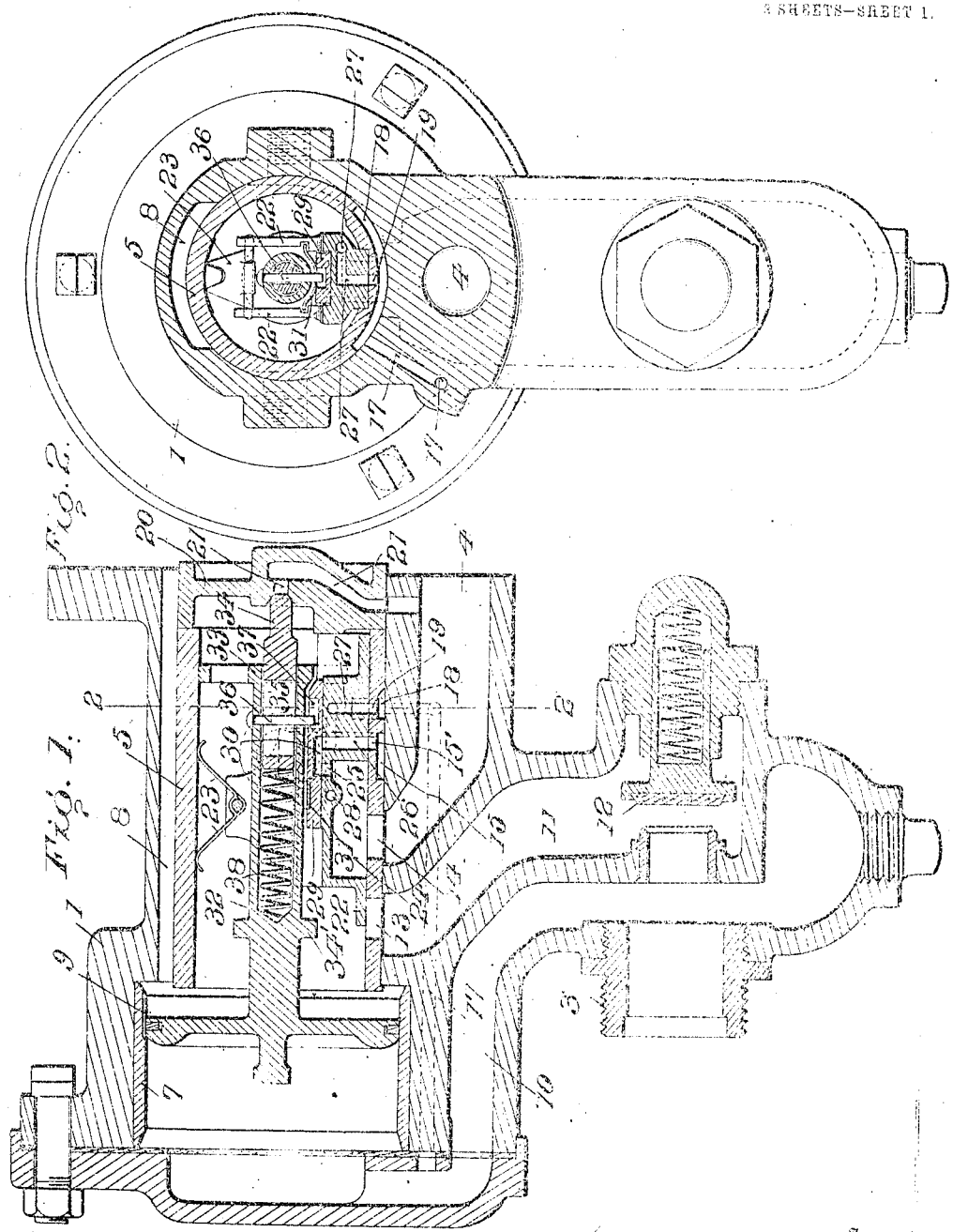

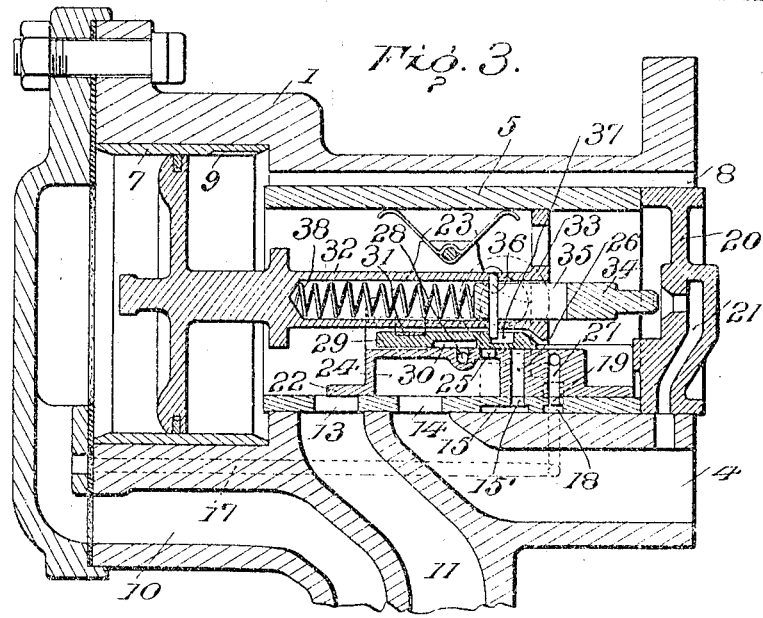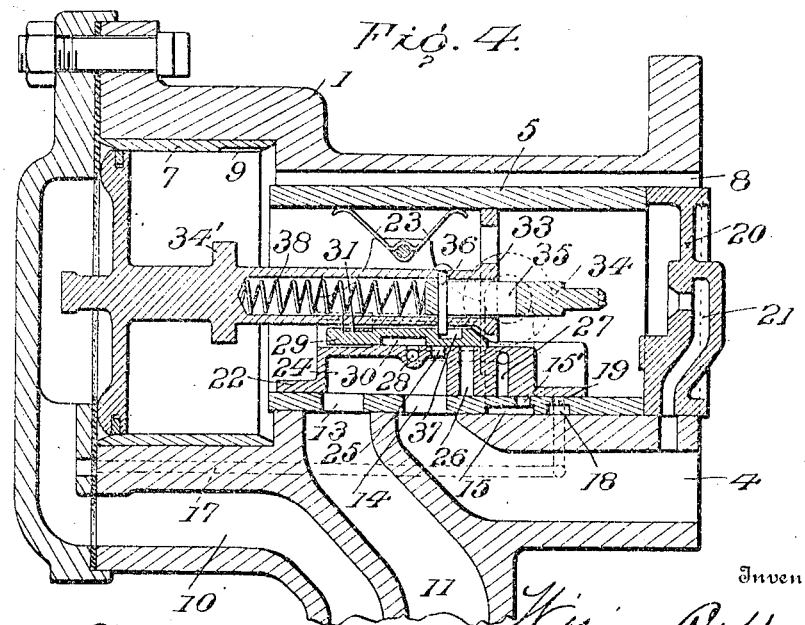

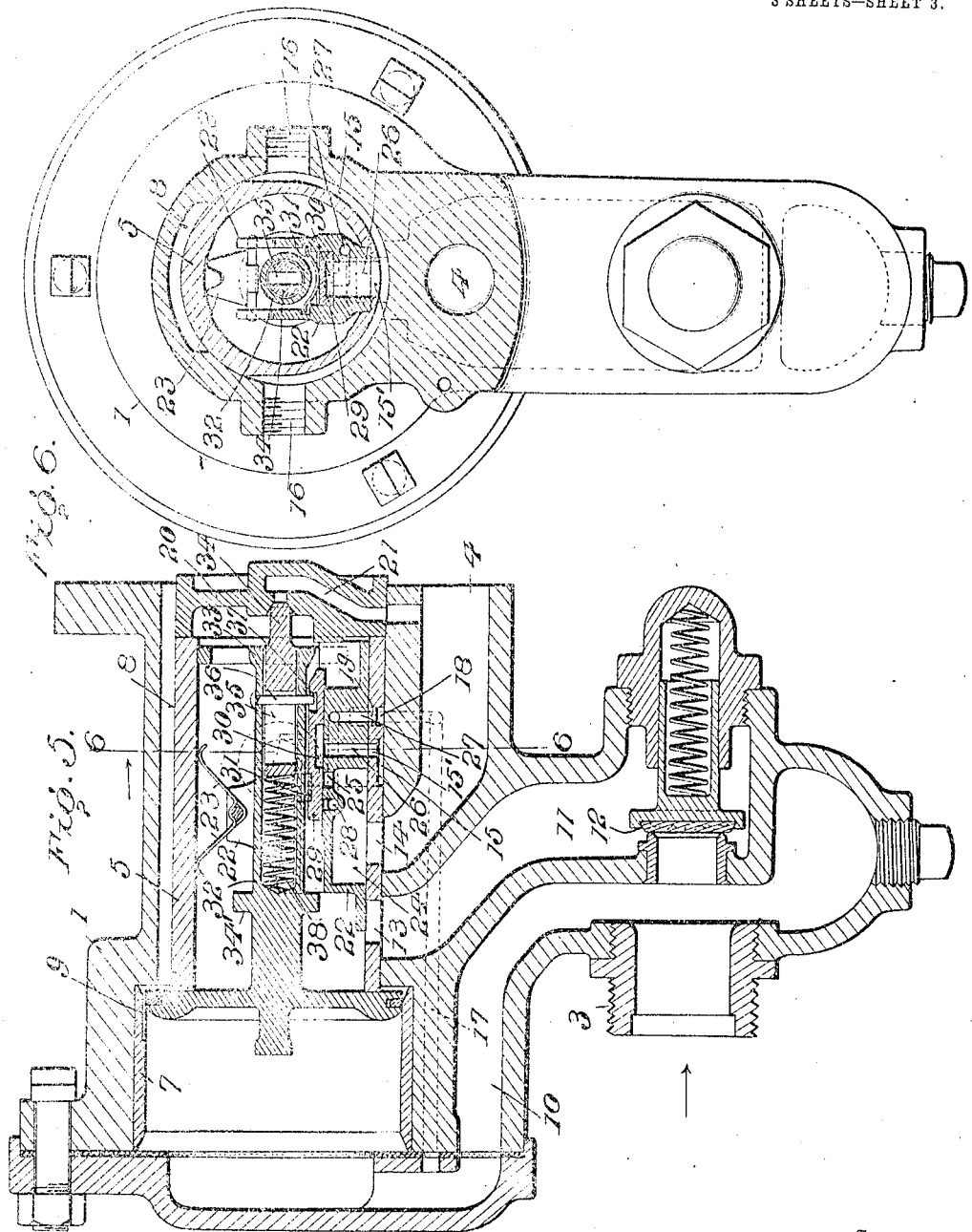

WILLIAM B. MANN, OF BALTIMORE, MARYLAND, ASSIGNOR TO PHILIP MAURO AND S. T. CAMERON, TRUSTEES, BOTH OF WASHINGTON, DISTRICT OF COLUMBIA.

TRIPLE VALVE FOR AIR-BRAKES 943,983.     Specification of Letters Patent.     Patented Dec. 21, 1909.

Application filed July 31, 1906. Serial No. 328,576.

*To all whom it may concern:*

Be it known that I, WILLIAM B. MANN, of Baltimore, Maryland, have invented a new and useful Improvement in Triple Valves for Air-Brakes, which improvement is fully set forth in the following specification.

This invention relates to air brakes, and more particularly to the triple-valves employed in standard brake systems for controlling the application and release of the brakes.

In very long trains, when reduction is made in train-pipe pressure for service application of the brakes, the reduction of pressure in the train-pipe is felt more quickly at the forward than at the rear end of the train, with the result that the brakes are applied on the forward cars sooner than on the rear cars, thus checking the momentum of the front part of the train while that of the rear part of the train remains unchecked, to the damage of the rolling stock. Again, in releasing the brakes on long trains, the increased pressure at the forward end of the brake-pipe occurs quicker than it does at the rear part of the pipe, thus releasing the brakes on the forward cars while those on the rear cars remain applied, thus endangering the breaking of the train by reason of the drag on the rear end thereof. Moreover, the slow travel of the increased pressure to the rear of the pipe to release the brakes is due not only to the length of the pipe, but among other things to the absorption of air passing from the pipe to the auxiliary reservoirs on the forward cars in recharging such reservoirs.

The objects of the present invention are: First, to provide for serial and nearly simultaneous service applications of the brakes on all cars throughout a long train; second, to provide for a release of the brakes at the rear end of a long train first, and then from the rear forward toward the front end; third, to provide for the even recharging of the auxiliary reservoirs throughout a long train.

In my application Serial No. 321,778, filed June 14th, 1906, I have shown, described and claimed a structure having the same objects in view, and the structure of the present application is the same as that mentioned in the above application for accomplishing the first and third objects above mentioned. The present invention, however, accomplishes the release of the brakes at the rear end of a long train, and then from the rear forward, in a different manner. In my aforesaid application there was provided an exhaust port which, when increased pressure was admitted to the train-pipe for releasing the brakes, was materially restricted so that the pressure in the brake-cylinder would escape very slowly therethrough, the restricted port, however, being gradually opened, so that by the time the brakes at the rear of the train were thrown to release position, the exhaust ports on the front of the train were fully opened, so that the exhaust was completed on all the cars throughout the train in a direction from the rear forward.

By the present invention there is provided a release port which, when brake-releasing pressure is admitted to the train-pipe, is fully closed on the cars at the forward part of the train, but remains open on the cars at the rear of the train, to the end that the brake-cylinders may become exhausted and the brakes released on the rear cars, after which the exhaust port on the forward cars is gradually thrown to open position, thus releasing the brakes on the forward cars of the train after they are released on the rearward cars.

The recharging of the auxiliary reservoirs and the serial venting of the train-pipe is, as before stated, accomplished in the same way as in the structure shown, described and claimed in my aforesaid application. As in the structure of my said application, the objects afore-mentioned are secured without adding to the number of parts of the triple-valve, and therefore, without increasing the complication of the same, so that the simplicity of the valve is maintained, and its economy of construction and certainty of operation are also secured.

The invention is capable of receiving a variety of mechanical expressions, one of which, for the sake of clearness in description, is illustrated in the accompanying drawings, but it is to be understood that such drawings are for the purpose of illustration only, and are not to be taken as defining the limits of the invention, reference being had to the description and claims for that purpose.

In said drawings—Figure 1 is a vertical longitudinal section of my improved triple-valve, with the parts in full release or normal running position; Fig. 2 is a transverse vertical section on the line 2—2 of Fig. 1; Fig. 3 is a vertical longitudinal section similar to Fig. 1, with the lower part broken away, and the parts of the triple-valve in the position they occupy when service application of the brakes is being made, and air is passing from the auxiliary reservoirs to the brake-cylinders. Fig. 4 is a similar view to Fig. 3, but with the parts in position for emergency application of the brakes; Fig. 5 is a view similar to Fig. 1, with the parts in the position which they occupy in the valves on the forward part of the train when braking pressure has just been admitted to the brake-pipe, showing the exhaust valve in position to close the exhaust port, and with a restricted recharging of the auxiliary reservoir taking place; and Fig. 6 is a vertical transverse section on the line 6—6 of Fig. 5.

Referring to the drawings in which similar reference numerals refer to like parts, 1 is the valve casing, 3 is the train-pipe coupling, 4 is a port leading to the brake cylinder, 5 is a bushing in the valve chamber, 7 a bushing in the piston cylinder, 8 the conduit leading from the valve chamber to the auxiliary reservoir, and 9 is the groove leading from the train-pipe side of the piston to the auxiliary reservoir side thereof, this groove being slightly longer than the feed-in duct usually employed in triple valves as heretofore constructed.

10 is the conduit leading from the train-pipe to the piston-cylinder, 11 the conduit leading from the train-pipe past the check-valve 12, and through port 13 into the valve-chamber.

14 is a port leading from the interior of the valve-chamber to the brake-cylinder passage 4, while 15 is the exhaust passage cut around the exterior wall of bushing 5, as clearly shown in Figs. 5 and 6, communicating with the atmosphere through ports 16, 16 and with the valve-chamber through a port 15'. Conduit 17 (see dotted lines Figs. 1, 3) leads from the train-pipe conduit through the body of the valve casing to a groove 18 (Figs. 2, 3) in the casing 5, and is connected by a port 19 with the interior of the valve chamber. The partition 20 closes the auxiliary reservoir side of the valve-chamber, and 21 is a conduit leading from the valve-chamber to the brake-cylinder conduit 4.

22 is the primary or principal valve, 23 the spring therefor, and 24 is a large cavity formed in said valve, long enough to connect ports 13 and 14 when the parts are in emergency position. Port 25 connects cavity 24 with the valve chamber, and 26 is a port leading from top to bottom through the valve 22, said port being so positioned that it registers with the exhaust port 15' when the parts are in full release position. Valve 22 is provided with a duct 27 extending through the body of the valve, one end of which duct registers with port 19, and the other end opens through a port 28 in the top of valve 22 and into the valve chamber. Resting on the valve 22 is a sliding exhaust valve 29, having on its under-side a cavity 30 of sufficient length to connect and fully register with ports 25 and 26 formed in the valve 22, said cavity being so proportioned that when the parts are in normal or full release position, shown in Fig. 1, it affords unrestricted communication between the port 25 and the exhaust port 26.

Up to this point the construction and arrangement of parts are the same as that shown in my afore-mentioned application, with the exception that the proportions and relative arrangement of ports 25 and 26 and the cavity 30 in slide valve 29 are such that while the ports 25 and 26 are connected when the parts are in full release position shown in Fig. 1, there is no connection between said ports 25 and 26 by way of the cavity 30 when the parts are in the position shown in Fig. 5, that is, when the parts are in the position which they occupy on the cars at the forward part of the train just at the time when full release pressure has been first admitted to the train-pipe. In my aforesaid application, the proportion of these parts was such that when full release pressure was admitted to the train-pipe on the forward part of the train, and the valve-operating piston took the position shown in Fig. 5, there was a restricted communication between the ports 25 and 26, whereas in the present case, the slide valve 29 is thrown so far to the right in Fig. 5 as to entirely cut off communication between ports 25 and 26, and hence there is no restricted escape of air from the brake-cylinder to the atmosphere, as in my aforesaid application, the pressure in the brake-cylinder being held on except for the momentary puff of air that may escape as the cavity 30 passes over the ports 25 and 26.

As in my aforesaid application No. 321,778, valve 29 (Fig. 2) is held to its seat by a spring 31 reacting between said valve and the side flanges of the valve 22. The valve piston is provided with a hollow piston stem 32, with a spider 33 on its forward end and a flange or shoulder 34', said spider and shoulder operating the valve 22 in the usual way when the piston is reciprocated, there being, however, a certain amount of lost motion between the piston stem and said valve. Graduating valve 34 is mounted in the hollow piston stem 32 and controls port 21, and is provided with a longitudinal slot 35 through which passes a pin 36 extending through the body of the piston stem and the slot 35 in the valve 34, and with its lower end projecting below the piston stem and entering a groove 37 in the top of slide valve 29, groove 37 being of such length as to permit a certain amount of lost motion between the piston stem 32 and said valve 29. Within the bore of the piston stem is a spring 38 reacting between the end of the bore and the graduating valve 34, and serving to hold the graduating valve to its seat. This spring is of such strength that when air pressure is equalized upon the train-pipe and auxiliary reservoir sides of the valve-operating piston, the spring serves to move the piston from the position shown in Fig. 5 to that shown in Fig. 1.

Operation: In emergency and service applications of the brakes in the present invention, the parts operate precisely as set forth in my aforesaid application, and the recharging of the auxiliary reservoir is accomplished in the same way as is set forth in my said application. The retarded release of the brakes, however, is accomplished in a different way. When increased pressure is admitted through the engineer's valve to the train-pipe for the purpose of releasing the brakes, whether from emergency or service applications thereof, the pressure mounts high enough in the train-pipe on the cars at the forward end of the train to throw the valve from the emergency or service application position to what I characterize as the retarded release position, that is, the position shown in Fig. 5. In this position the graduating valve 34 operates to close the conduit 21 leading from the auxiliary reservoir to the brake-cylinder, and the valve-operating piston operates to prevent all passage of air from the train-pipe to the auxiliary reservoir, except the small amount that will slowly leak in through duct 9. The valve 22 is thrown into position shown in Fig. 5, that is, in a position to disconnect ports 13 and 14, and with port 26 registering with exhaust port 15', and duct 27 registering with port 19. In this position, however, the slide valve 29 has been carried so far from left to right as to cut off communication between ports 25 and 26, and thereby cut off communication between the brake-cylinder and the atmosphere. This position of the slide valve 29 as shown in Fig. 5, will only occur on the cars at the forward part of the train, since the train-pipe pressure at the rear end of the train will be insufficient to entirely force the valve-operating piston closely up against the left-hand end of the pushing 5 against the tension of spring 38, and the parts will therefore assume substantially the position shown in Fig. 1 on the rearward cars of the train. As the train-pipe pressure, however, is gradually deflected by the charging of the auxiliary reservoirs along the train, which charging will be more rapid at the rear end of the train than on the forward portion thereof, the spring 38 reacts between the graduating valve 34 and its seat in the piston stem, and slowly moves the valve-operating piston from the position shown in Fig. 5 to that shown in Fig. 1, whereupon the lower projecting end of the pin 36 moves in the slot 37 and serves to shift slide valve 29 from right to left, that is, from the position shown in Fig. 5 to the position shown in Fig. 1, this action occurring on the cars on the forward part of the train. As soon as this occurs there is a full exhaust channel open from the brake cylinder via the duct 4, cavity 24, port 25, cavity 30, ports 26 and 15', and groove 15.

It will also be seen from the foregoing that by the construction described, I succeed in holding brakes with full braking pressure in the auxiliary reservoir, on the forward part of the train while releasing the brakes upon the rear part of the train, and then gradually effect the release of the brakes on the forward part of the train by the reverse or backward action of the valve-operating piston and the exhaust valve controlled thereby.

It will be seen that the relative proportion and arrangement of parts may be varied without departing from the real invention herein described, and I therefore wish it distinctly understood that I regard such variations as within the limits of my invention.

What I claim is:

1. In a triple-valve, a valve having a normal or exhaust and a non-exhaust position, a graduating valve controlling the passage of auxiliary reservoir air to the brake cylinder, a piston for operating both of said valves with lost motion between said valves and piston, and a spring reacting between said graduating valve and piston whereby said first-mentioned valve is moved from non-exhaust to exhaust position.

2. In a triple-valve, a piston having a partial traverse for service applications and a full or farther traverse for emergency applications of the brakes, a valve moving with said piston only on emergency applications and through which the brake cylinder exhausts, a graduating valve independent of said first named valve and moving with said piston on both emergency and service applications, and an exhaust valve moving on the first valve and having an exhaust position thereon and two non-exhaust positions one on either side of said exhaust position, said exhaust valve being operably connected to said piston.

3. In a triple-valve, an exhaust valve, and a triple-valve-operating piston operated by variations in train-pipe pressure, said exhaust valve and piston each having a release position and two non-release positions one on either side of said release position, and a spring carried by said piston and tending through it to throw said valve from one non-release position to release position.

4. In a triple-valve, the combination of an exhaust valve, an emergency valve and a valve-operating piston engaging both of said valves, said exhaust valve and piston each having a release position and two non-release positions one on either side of said release position, and said emergency valve moving only on emergency applications, and a spring acting on said piston and tending to throw it from one of said non-release positions to said release position.

5. In a triple-valve, the combination of a valve through which exhaust from the brake cylinder passes to release the brakes, an exhaust valve controlling said exhaust, a valve-operating piston operatively connected to said first named and exhaust valves, said exhaust valve and piston each having a release position and two non-release positions one on either side of said release position, and a spring acting on said piston and tending to throw it from one of said non-release positions to said release position.

6. In a triple-valve, the combination of a valve through which exhaust from the brake cylinder passes to release the brakes, an exhaust valve controlling said exhaust, a valve-operating piston operatively connected to said first named and exhaust valves, said piston and exhaust valve each having an exhaust position and two non-exhaust positions one on either side of said exhaust position, and means acting on said piston and tending to throw it from one of said non-exhaust positions to said exhaust position.

7. In a triple-valve, the combination of a valve through which exhaust passes from the brake cylinder to release the brakes, an exhaust valve controlling said exhaust, a piston operatively connected to said exhaust valve, said piston and valve each having an exhaust position and two non-exhaust positions one on either side of said exhaust position, a graduating valve carried by said piston, and a spring on said piston tending to throw it from one of said non-exhaust positions to its exhaust position.

8. In a triple-valve, the combination of a valve through which exhaust passes from the brake cylinder to release the brakes, an exhaust valve controlling said exhaust, a piston operatively connected to said exhaust valve, said piston and valve each having an exhaust position and two non-exhaust positions one on either side of said exhaust position, a graduating valve carried by said piston, and means acting on said piston and tending to throw it from one of said non-exhaust positions to its exhaust position.

9. In a triple-valve, the combination of an exhaust valve, a graduating valve and a valve-operating piston, said exhaust valve and piston having an exhaust position and two non-exhaust positions one on either side of said exhaust position, and a spring carried by the piston and tending to throw said piston from one of said non-exhaust positions to its exhaust position.

10. In a triple-valve, the combination of an exhaust valve, a graduating valve and a valve-operating piston, said exhaust valve and piston having an exhaust position and two non-exhaust positions one on either side of said exhaust position, and means carried by the piston and tending to throw said piston from one of said non-exhaust positions to its exhaust position.

11. In a triple-valve, the combination of an exhaust valve, a graduating valve and a valve-operating piston, said exhaust valve and piston having an exhaust position and two non-exhaust positions one on either side of said exhaust position, and a spring reacting between said piston and graduating valve and tending to throw said piston from one of said non-exhaust positions to its exhaust position.

12. In a triple-valve for air brakes, the combination of a valve through which exhaust passes to release the brakes, an exhaust valve capable of movement independent of said first valve, a piston operatively connected to both of said valves, a graduating valve carried by said piston and controlling the passage of air from the auxiliary reservoir to the brake cylinder, said exhaust valve and piston each having an exhaust position and two non-exhaust positions one on either side of said exhaust position, and a spring acting on said piston and tending to throw it from one of said non-exhaust positions to said exhaust position.

13. In a triple-valve, the combination of a valve-operating piston having a graduating or service position (which is also a non-exhaust position) and a second non-exhaust position, an exhaust position intermediate said two non-exhaust positions, an exhaust valve operated by said piston to control the exhaust from the brake cylinder, a graduating valve connected to said piston but movable relative thereto, and a tension device reacting between said graduating valve and piston.

14. In a triple-valve, the combination of a casing having a restricted and an unrestricted charging passage from the trainpipe to the auxiliary reservoir, an exhaust valve having an exhaust position and two non-exhaust positions one on either side of said exhaust position, and a piston controlling said charging passages and said exhaust valve and having two non-exhaust positions one of which is a braking position permitting air to pass from the auxiliary reservoir to the brake cylinder, and an exhaust position intermediate said non-exhaust position.

15. In a triple-valve, the combination of a brake cylinder having an exhaust passage, an exhaust valve closing said passage during an application of the brakes and upon the initial application of train-pipe pressure to release the brakes, and means shifting said valve into position to open said passage when the release pressure in the train-pipe is lowered by the charging of the auxiliary reservoirs.

16. In a fluid pressure brake system, the combination of a triple valve having a piston, a valve with lost motion and a secondary valve operated by said piston, and a passage for releasing brakes controlled by both said valves, which may be closed while the piston is moved to one limit of its traverse by increasing train pipe pressure and then opened when the secondary valve makes a partial movement in the opposite direction.

17. In a fluid pressure brake system, the combination of a triple valve having a piston, a valve with lost motion and a secondary valve operated by said piston, a passage for releasing brakes so controlled by both valves that the passage may be closed while the piston is actuated by admitting train pipe pressure and opened when the piston and secondary valve make a partial movement in the opposite direction, and means for causing said partial movement.

18. In a triple valve, a piston capable of occupying three positions one of which is intermediate of the other two, a primary valve and a secondary valve operated by said piston which valves control a passage through which air escapes to release the brakes and which leave the said passage open when the piston is in its intermediate position, and a spring for moving said piston from one extreme to said intermediate position to release the brakes.

19. In a triple valve, a piston capable of occupying three positions one of which is intermediate of the other two, a primary valve and a secondary valve operated by said piston, said primary valve having a brake-releasing passage therethrough controlled by the secondary valve and which passage is open while said piston occupies said intermediate position, and means for moving said piston from one of its outer positions to said intermediate position to release the brakes.

20. In a triple valve, the combination of a primary valve having a brake-releasing passage therethrough, a secondary valve controlling said release passage, a piston operatively engaging both said valves whereby said release passage is open when said piston is in a position intermediate its two extreme positions, and means tending to move said piston and secondary valve from an outer position to said intermediate position.

In testimony whereof I have signed this specification in the presence of two subscribing witnesses.

WILLIAM B. MANN.

Witnesses:
  Aug. W. Bradford,
  John B. McGraw.